Jan. 12, 1954  J. A. LAUCK  2,665,637
PUMPING SYSTEM
Filed May 7, 1947  3 Sheets-Sheet 1
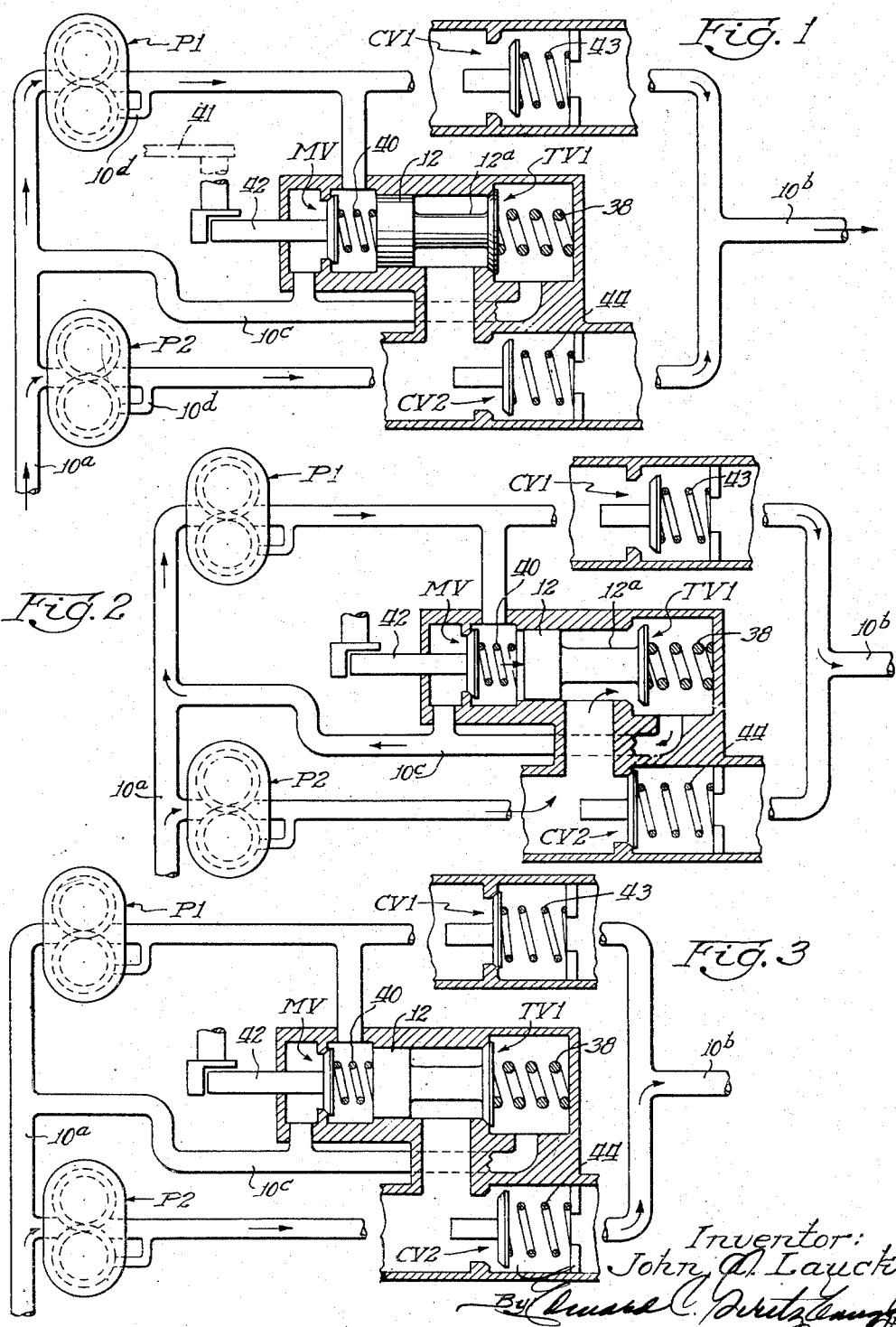
Inventor:
John A. Lauck Inventor:
John A. Lauck Jan. 12, 1954  J. A. LAUCK  2,665,637
PUMPING SYSTEM
Filed May 7, 1947  3 Sheets-Sheet 3
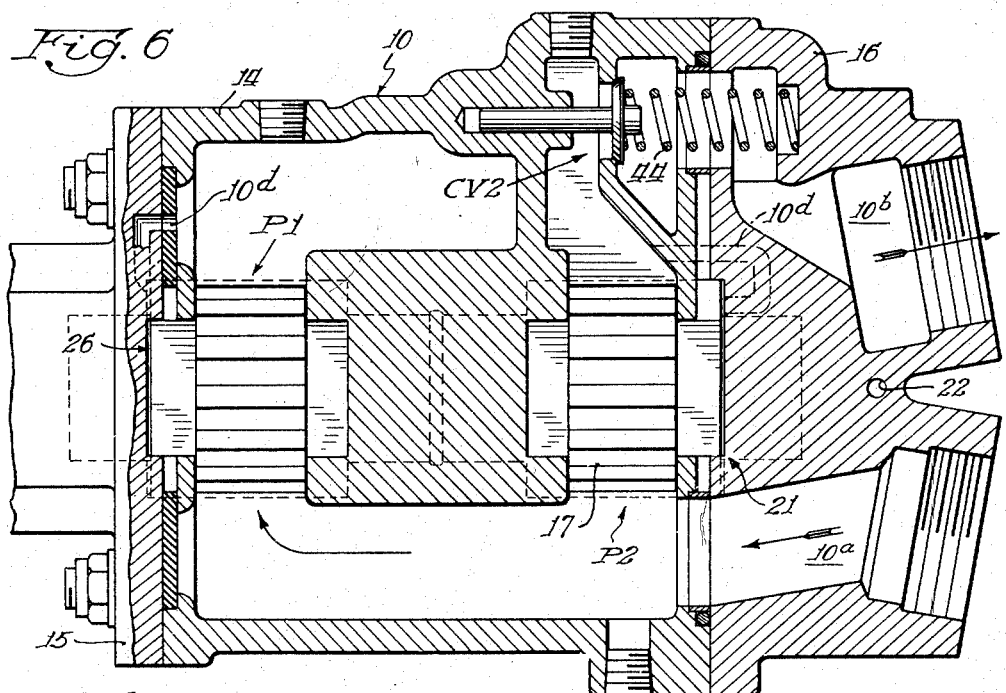
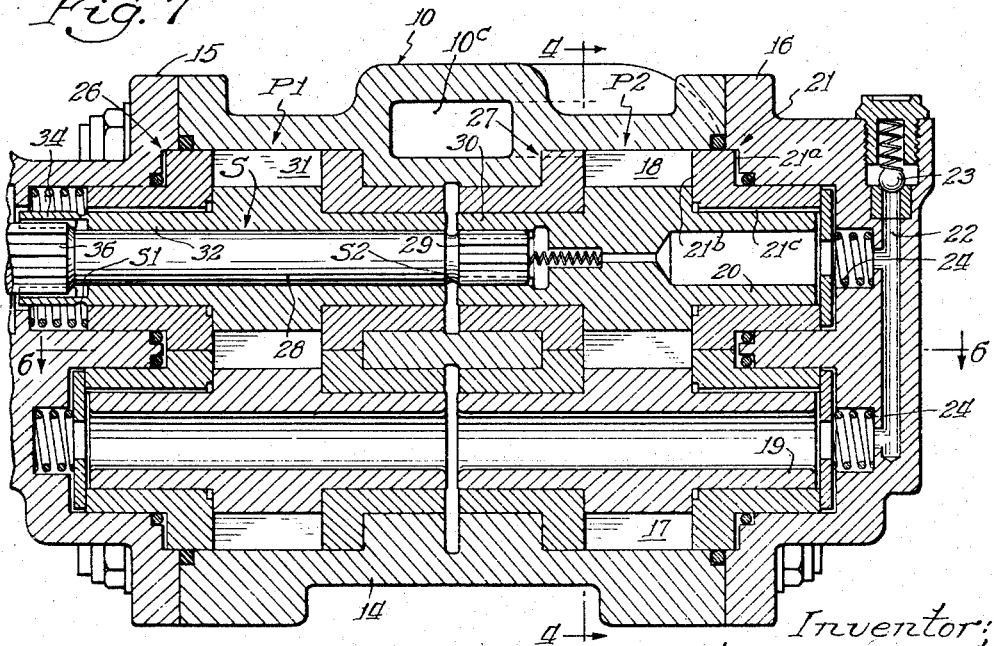
Inventor:
John A. Lauck
By Edward C. Fritzlaugh
Atty.

Patented Jan. 12, 1954

2,665,637

UNITED STATES PATENT OFFICE 2,665,637

PUMPING SYSTEM

John Alfred Lauck, South Euclid, Ohio, assignor to Borg-Warner Corporation, Chicago, Ill., a corporation of Illinois Application May 7, 1947, Serial No. 746,584

6 Claims. (Cl. 103—4)

This invention relates to liquid pumps of the intermeshing gear type and particularly to an arrangement of a plurality of such pumps wherein separate pump units are continuously connected together in driving relation, a first pump unit functioning to normally deliver liquid, while a second pump unit acts as a rotating emergency or stand-by.

In pumping equipment of the present character, it has been found that one gear unit operating alone to supply liquid fuel does not afford the necessary factor of safety, particularly in an aircraft installation. The previously employed arrangements, including an additional separate gear pump unit for delivering liquid in the event of a failure of the primary pump, have involved certain definite disadvantages, including, among others, additional weight, and difficulty in starting up the emergency pump upon failure of the primary pump. The problem is often particularly aggravated by the character of the liquid being pumped, this being in many instances kerosene or allied fuel, having a low viscosity not suitable for being handled by the usual fixed clearance pump and not conducive to long life of any pump used to effect the movement thereof.

It is an object of the present invention to provide multiple pumping units of the intermeshing gear type in a single housing, connected together in continuously driving relation with the provision of the requisite control valves for causing one of these gear units to normally carry the pumping load while removing the pumping load from the other or emergency pump and at the same time reducing to a minimum the amount of power required to continuously rotate this emergency or stand-by pump. It is a further object to provide in an assembly of this character, means automatically responsive to a predetermined drop in the pressure being delivered by the first or primary pump, incident to a failuure therein, to cause the second or rotating emergency stand-by pump to become effective and to take over the delivery of liquid. It is a still more particular object to provide in an assembly of this character for a precisely controlled pressure loading of the end plates or sealing bushings by means of the pressure generated by the respective gear units with the result that when either pump unit is being rotated merely as a stand-by, the principal frictional resistance to the rotation of the stand-by unit is that produced by the initial loading springs, while the engagement of the sealing bushings with the side faces of the gears of the pump unit actually delivering liquid is determined by the degree of pressure loading thereof, thus effecting an appreciable economy in the over-all amount of power required to operate both the primary and rotating stand-by pump units. While other forms of pressure loading of the bushings may be employed, it has been found that unusually effective results are realized by the form herein disclosed, and which form is disclosed and claimed per se in Lauck Patent No. 2,420,622, May 13, 1947. An additional advantage of controlling importance is the fact that the pressure loaded bushings make it practicable to pump low viscosity liquids, such as kerosene, that cannot be effectively pumped by fixed clearance gear pumps. Furthermore, such a pressure loading arrangement makes it possible to use much smaller and lighter weight gears, housing, etc., for the same volumetric capacity and with the other advantages attendant to pressure loading.

It is another object of this invention to provide an arrangement of the present character for the initial delivery of both pumps in parallel at the beginning of rotation, thus giving the increased volume resulting from the delivery of both pumps during the initial or beginning stage of operation, this being followed, upon the delivery of a predetermined value of pressure, by the operation of an automatically responsive valve means effective to cause the return flow of the rotating stand-by pump back to the inlet of the primary pump, thus reducing the pressure against which the rotating emergency stand-by pump operates, to a very low value while the primary pump continues to deliver the liquid fuel, subject to any breakdown or failure of this primary pump, whereupon the rotating stand-by pump is again automatically cut in by the pressure responsive valve means to carry the load while by-passing the defective primary pump.

It is an additional object to provide a manually accessible control member effective upon operation to cause the transition from the delivery of pressure by one of the pumps to delivery by the other.

Still another detailed object is the provision of means connecting the two pumping units to a suitable source of power, particularly characterized by the provision of shear sections effective upon the occurrence of a predetermined value of torque resulting from a breakdown, of either pump unit, to provide for the continued rotation of the other unit unaffected by such breakdown.

The above, and other objects, advantages and uses of the present invention will become apparent from a reading of the specification and claims taken in connection with the appended drawings, which form a part thereof, and wherein:

Figs. 1 thru 3 present schematically the typical positions and conditions of operation of the parts forming a preferred embodiment of the present invention, including Fig. 1 showing the position upon starting wherein both pumps are delivering to the outlet; Fig. 2 showing the primary pump delivering to the outlet with the rotating stand-by operating against low pressure and feeding to the inlet of the primary pump; and Fig. 3 showing the position with the primary pump by-passed and the stand-by pump operating to deliver pressure liquid to the outlet;

Figure 4:
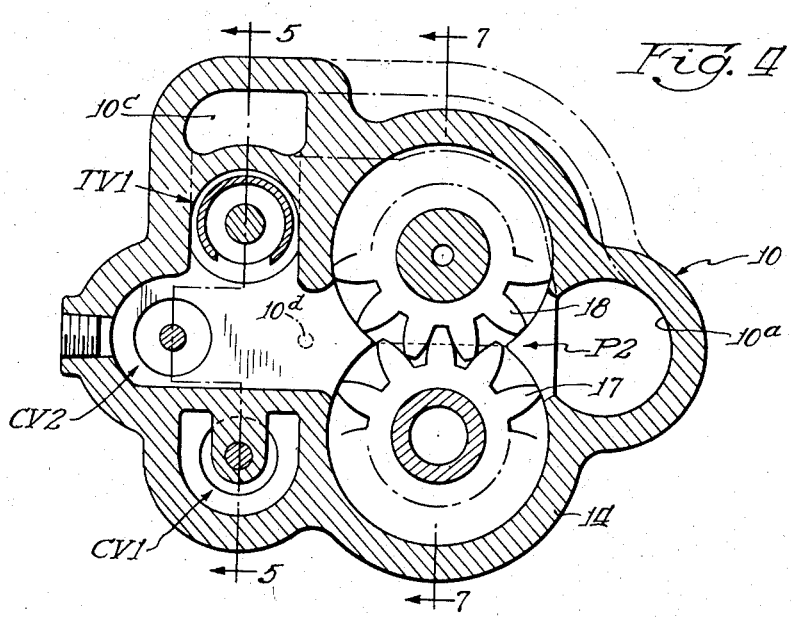
Fig. 4 is a cross sectional view taken substantially along the line 4—4 of Fig. 7, showing the structural arrangement of an actual embodiment of the present invention.
Figure 5:
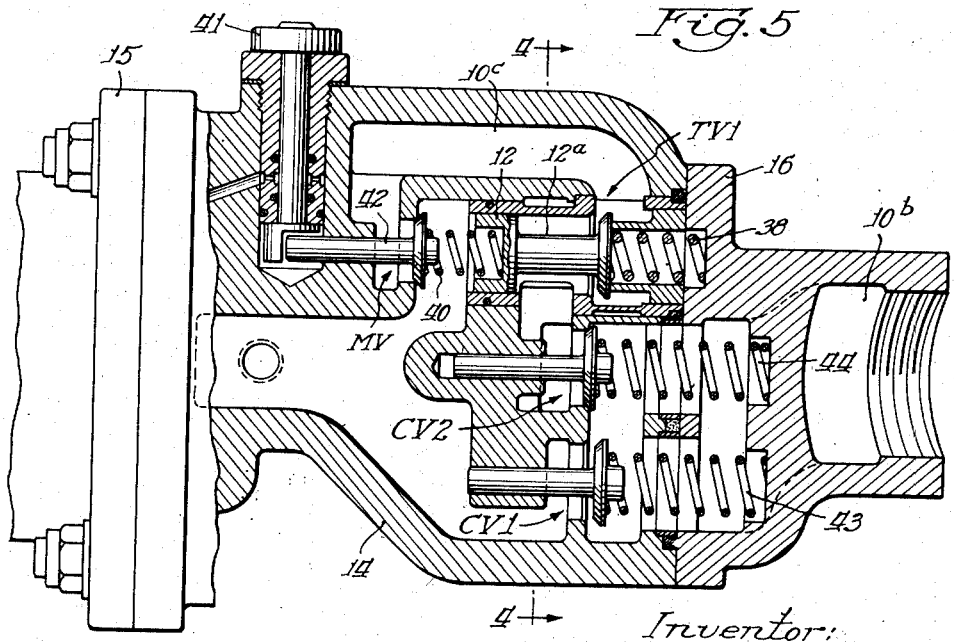
Fig. 5 is a sectional view taken substantially on the line 5—5 of Fig. 4, and bringing out to particular advantage the location and operation of the automatic as well as the manual transition valves.

Fig. 6 is an axial section view taken substantially on the line 6—6 of Fig. 7, and bringing out to particular advantage the manner of delivering the liquid pressure generated by the respective pumps to the back sides of the end plates or sealing bushings; and Fig. 7 is a sectional view taken substantially on the line 7—7 of Fig. 4, and bringing out to particular advantage the correlated relationship between the respective gear pumps incorporating the shear sections in the quill and shaft assembly responsive to a selected value of torque to permit the independent rotation of the unaffected pump following the breakdown.

Reference will now be made in somewhat greater detail to the particular arrangement of structure and mode of operation, selected as a preferred embodiment for the purpose of disclosing the present invention. Turning to the figures of the drawing, the essential assemblies will first be described, making reference to only those details deemed important to the necessary understanding of the present invention.

A unitary housing 10 incorporates or encloses a first or primary pump P-1 of the intermeshing gear type connected in continuous driving relation with a second or emergency pump P-2, likewise of the intermeshing gear type, the assembly forming the driving connection being referred to generally at S.

The enclosing housing 10 is provided with a main inlet 10-a and a main outlet 10-b. A first check valve assembly CV-1 functions to prevent reverse flow back to the discharge side of the gears of primary pump unit P-1, while a second check valve assembly CV-2 functions to prevent return flow back to the discharge side of the gears of pump P-2. Transfer or transition valve assembly TV-1 functions to determine the three conditions of operation of the two pumps P-1 and P-2. This transition valve TV-1 is provided with a motive piston 12 responsive to the occurrence of a predetermined value of pressure at the discharge side of the gears of pump P-1 to cause transfer or transition valve TV-1 to open and place the discharge side of continuously rotating emergency stand-by pump P-2 in communication with the inlet side of primary pump P-1, thus removing the load from pump P-2 under normal operating conditions.

Manually operable valve MV is effective to release the pressure acting against motive piston 12 and thus to selectively manually cause the transition from pressure delivery by pump P-1 to pressure delivery by pump P-2.

It will thus appear by particular reference to Figs. 1 to 3 that the present arrangement has three principal conditions of operation. In Fig. 1 there is illustrated schematically the initial condition of operation wherein both pumps P-1 and P-2 are delivering in parallel from the inlet 10-a to the outlet 10-b thus giving an increased displacement upon starting, which is desired in the class of aircraft fuel system contemplated. When the pressure of delivery has risen to the value desired, and above which motive piston 12 is set to operate, which is determined by an associated spring, then motive piston 12 will move to the right in Fig. 1 to the position shown in Fig. 2, thus opening transfer or transition valve TV-1, placing the discharge side of emergency pump P-2 in communication with the inlet side of the gears of primary pump P-1, through passage 10-c. This will result in the pressure that is being generated by primary pump P-1 acting upon the second check valve CV-2 to thus close the same and isolate emergency pump P-2 from the main outlet 10-b.

The above condition of operation illustrated schematically in Fig. 2, will continue to prevail until either the automatically responsive motive piston 12 becomes effective to again close transfer valve TV-1, or, alternatively, until the manually operable valve MV is selectively operated to accomplish the same purpose. If automatic operation is relied upon, then upon the occurrence of a selected drop in pressure at the discharge side of pump P-1, such as would occur upon the development of a defect in pump P-1, motive piston 12 will move to the left to the position shown in Fig. 3, closing the transfer valve TV-1, and thus causing emergency pump P-2 to deliver through the second check valve CV-2, to outlet 10-b. This delivery by pump P-2 will likewise cause the first check valve CV-1 associated with primary pump P-1 to be closed, to thus isolate pump P-1 from outlet 10-b and from pump P-2.

From the above it will be made to appear that a very effective solution has been provided for an emergency condition that has been found to occur with too great a frequency, particularly on aircraft wherein the problem of transferring low viscosity fuel from the fuel tank to the point of consumption has been such a real factor in attempting to assure the safe operation of aircraft generally.

Turning now in still further detail to the structural composition of the present assembly, housing 10 is preferably formed of a light alloy metal, such as an aluminum alloy, and may be made in any number of parts facilitating fabrication and assembly, it having been found desirable in the assembly illustrated to form the same in three parts, including a main body portion 14, closed at one end by a closure member 15 formed with special reference to cooperation with the end sealing bushings and shaft seal, as will appear, and a second closure member 16 at the other end formed with special reference to cooperation with the control valves and having the main inlet 10-a and outlet 10-b therein.

Both pumps P-1 and P-2 are of substantially the same fundamental construction, and pump P-2 will be described in some detail by way of example. Pump P-2 includes intermeshing gears 17 and 18 having coaxially oppositely extending journals 19 and 20. The left-hand journal 20 of gear 18 is internally splined at 30 for the reception of a complementary splined driving shaft forming part of a novel driving assembly S between pumps P-1 and P-2 to be described in greater detail.

The requisite pumping seal is accomplished by means of a bushing and bearing assembly indicated generally at 21 in cooperation with the associated fluid passages for properly exposing the pressure responsive surfaces of the bushing to the required refinement of differential of pressure force acting in the direction of the gear side face. The particular pressure loaded structure per se discussed herein, and preferred because of the unusual proven advantages thereof, is covered by Roth and Lauck copending application, Serial No. 439,030, now Patent No. 2,420,622. Essentially, back face 21-a is exposed to liquid pressure generated by the gear teeth of pump P-2 through the passage indicated schematically at 10-d. The area of surface 21-a subject to liquid pressure and the opposite gear engaging face 21-b, are so proportioned with reference one to the other that the force acting on bushing 21 in the direction of the gear side face is always slightly greater than the force acting on the gear tooth side of the bushing, hence the face 21-b is maintained in pumping seal relation with the associated gear side face. Axial channel 21-c places the radial inner extremity of bushing face 21-b in communication with a zone of low pressure through passage 22 and ball check valve 23. Check valve 23 regulates the pressure on the usual driving seal (not shown) and the pressure within the annular relief groove on the face of the bearings, at the inner radial terminal of surface 21-b. As pointed out in the above referred to patent, the requisite refinement of counterbalance can be determined in arriving at the initial design of the bushing by the common "cut and try" method, undercutting or relieving surface 21-b at the radial inner extremity thereof until it is observed that a pumping seal is effected upon assembly and operation. No further differential pressure in the direction of the gear side face is required regardless of how high a pressure the pump is called upon to develop. In order to assure an initial pumping seal upon starting, coil compression springs 24 are employed between the housing closure section 16 and the tubular terminal portion of the bushing. The spring 24 is merely strong enough to effect an initial priming or pumping seal sufficient to cause the gears to develop a pressure which, when delivered through passage 10-d to the back face 21-a of the bushing, adds sufficiently to the force holding the bushing in contact with the gear face to assure the maintenance of this pumping seal as the pressure builds up. A similar bearing and seal bushing assembly 26 is provided on the side of pump P-1 remote from bushing assembly 21. Generally similar bushing bearings 27 are provided for the inwardly extending journals and gear side faces; however, it is not necessary that these be pressure loaded, as will readily appear.

Particular importance is attached to the results obtained in the present combination by the above described pressure loading of the bushings. In aircraft installations, in particular, it is of critical importance that the power required to drive the various accessories, such as the present pump assembly, be maintained at the very minimum. It will readily appear that there is an appreciable power saving in the present assembly by virtue of the fact that the bushings are held in sealing engagement with the gear side faces with merely sufficient force to assure a pumping seal. Furthermore, when the second or emergency pump is merely rotating as a stand-by pump and delivering through transition valve TV-1 to the inlet side of the gear teeth of pump P-1, then the only frictional resistance imposed by the turning of pump P-2 is the small resistance resulting from the action of light springs 24. Thus the resistance to turning either when actually pumping or when merely rotating as an emergency stand-by pump is very small. This pressure loading arrangement further makes it possible to reduce the overall size and weight of the housing, the gears, and the other associated parts.

The connecting assembly S, for continuously connecting pumps P-1 and P-2 in driving relation, includes shaft 28 formed at one terminal with splines 29 telescoped within complementary splined tubular terminal portion 30 of gear 18 for driving the same. Shaft 28 passes coaxially through the upper gear 31 of pump P-1, the outwardly extending journal 32 of which is similarly formed with an internally splined tubular portion 34 embracing in telescoping relation a second complementary splined portion 36 on the other terminal of shaft 28. This splined portion 36 is adapted to have suitable connection with a source of power, such as the aircraft engine, in a manner not shown. It will be observed that but for the splined relationship between tubular portion 34 and splines 36, gear 31 could rotate freely on shaft 28.

Shear portions S-1 and S-2 are provided for the purpose of freeing or releasing the respective pumps from driving relationship in the event of failure of either pump, in order that the remaining pump may continue to be driven and deliver liquid. Shear portion or section S-1 is in the form of a groove in the tubular portion 34 resulting in a reduced section at this point having reduced strength. This reduced section is made to have a predetermined resistance to torque or driving force between the splines 36 of shaft 28 and gear 31. When this selected value of resistance or torque is exceeded, then the shear section S-1 will be broken and gear 31 may then remain stationary while shaft 28 continues to drive gear 18 of pump P-2. Similarly, shear section or weakened portion S-2 is formed in shaft 28 by providing an annular groove thereabout resulting in a reduced torque capacity in shaft 28 at this point, this torque capacity being made to have a selected value beyond which any torque produced by failure in pump P-2 to respond, resulting in a breaking of shaft 28 at shear portion S-2 and a release of pump P-2 while continuing to rotate pump P1, through splines 36 and complementary splined portion 34 of journal 32.

Transfer or transition valve TV-1 is preferably of the disc type, closing on its seat against the direction of flow from pump P-2 and urged in the closing direction by means of coil compression spring 38, which is given a selected strength dependent upon the value of pressure at which automatic transition is desired. It will also be understood that springs of varying strength may be substituted and that any of the well known arrangements for effecting adjustment in the compression of the particular spring employed (not shown) may likewise be used. A reduced cross section stem 12-a is preferably employed to connect the disc portion of valve TV-1 with motive piston 12. A second coil compression spring 40 is interposed between manual valve MV and motive piston 12, this spring being of a lighter character than spring 38, and serving to normally urge manual valve MV in the direction of closing. Manual lever 41 is accessible to the pilot or operator for selectively moving manual valve MV through stem 42. Check valves CV-1 and CV-2 are preferably of the disc type including coil compression spring 43 and 44 urging the same in the direction of the valve seat against the discharge pressures of the corresponding pumps.

While the present invention has been disclosed in connection with a particular embodiment thereof, it is to be understood that this is by way of example rather than limitation and it is intended that the scope of the invention be defined by the appended claims.

What is claimed is:

1. An intermeshing gear type pump assembly for transferring low viscosity liquid fuel including means defining an inclosing housing having a main inlet thereto and a main outlet therefrom, a first intermeshing gear unit within said housing normally functioning as a primary liquid pump, a second intermeshing gear unit within said housing normally functioning as a continuously rotating emergency stand-by liquid pump, each of said gear pumps being of the pressure loaded type comprising means defining end plates or bushings held in pumping seal engagement with the gear side faces by a small differential pressure generated by the particular gear unit, and passage defining means for applying to the back face of the bushings discharge pressure developed by said pump, control valve means operable to cause the delivery of liquid under pressure from both pumps to said main outlet from said assembly upon the initial operation thereof, said control valve means including a first check valve interposed between the discharge side of said primary pump and the outlet from said assembly, a second check valve interposed between the discharge side of said constantly rotating emergency pump and the outlet from said assembly, a transfer valve effective when operated to place the discharge side of said emergency pump in communication with the inlet side of said primary pump, motive means for operating said transfer valve, said motive means comprising a piston connected with said transfer valve and responsive to the occurrence of a predetermined value of pressure in communication with the discharge side of said primary pump effective to open said transfer valve and place the discharge side of said stand-by pump in communication with the inlet side of said primary pump, whereupon said second check valve is closed and communication is shut off between the discharge side of said primary pump and said emergency pump, said primary pump then functioning to deliver pressure to the main outlet of said assembly, said piston motive means being further operative in response to a predetermined drop in the pressure in communication with the discharge side of said primary pump to cause said transfer valve to close and said stand-by pump to deliver liquid under pressure through said second check valve to the main outlet of said assembly, said pressure delivered by said emergency pump being further effective to cause the closing of said first check valve to prevent the flow of liquid to said primary pump for said emergency pump.

2. The arrangement defined in claim 1 further particularly characterized by the provision of means defining a conduit having a valve therein, said valve being effective when open to place said motive means and said primary pump discharge in communication with a zone of relatively low pressure at the inlet side of said stand-by pump through said conduit, and manually actuatable means effective to selectively operate said last-named valve.

3. An intermeshing gear type pump assembly particularly adapted for transferring low viscosity liquid fuel from one point to another on an aircraft, including means defining an enclosing housing having a main inlet thereto and a main outlet therefrom, a first intermeshing gear pump unit normally functioning as a primary fuel transfer pump, a second intermeshing gear pump unit normally functioning as a continuously rotating emergency transfer pump, means connecting both of said pumps in continuous driving relation with each other, said connecting means including a first shaft passing through one of the gears of said first unit and connected with one of the gears of said second unit in splined driving relation thereto, said shaft being formed intermediate the ends thereof with a reduced cross section shear portion having a predetermined torque resisting capacity beyond which any excess torque becomes effective to sever said shaft at said shear point, said gear of said first unit connected to said first shaft being provided with an axially extending sleeve-like portion cooperating with said shaft in driving relation at a position on the opposite side of said first pump unit from said shear section of said shaft, said sleeve-like portion likewise being formed with a second reduced cross section shear portion responsive to the occurrence of a torque in excess of a predetermined value between said first pump and said driving shaft to thus become severed at said second shearing point, the severing of either of said shear portions resulting in the continued rotation of the gear pump unit corresponding to said other shearing portion.

4. An intermeshing gear type pump assembly including means defining an enclosing housing having a first intermeshing gear pump unit arranged to normally function as a primary liquid transfer pump, a second intermeshing gear pump unit arranged to normally function as a continuously rotating emergency liquid transfer pump, means connecting the said two pumps in continuous driving relation, said last-named means being adapted to be connected to a suitable source of power, said connecting means including a reduced cross-sectional shear portion intermediate the ends thereof and between the two pump units, and a second reduced cross-sectional shear portion on a sleeve-like journal member affixed to the first pump gear, said second shear portion being located between a driving connection with said connecting means and said gear of the first pump unit, said shear sections respectively being responsive to the occurrence of a predetermined excessive torque resulting from the resistance to turning by the corresponding one of said pumps, such for example as would occur upon a breakdown or failure of one of said pumps, to thus produce shearing of the particular shear portion associated with said defective pump, said driving means being effective to continue driving the other one of said pumps through the other of said shear sections.

5. A driving mechanism including an elongated quill shaft, a plurality of rotatable elements mounted on the quill shaft in axially spaced relation, each of said rotatable elements having a journal member associated therewith and affixed thereto, each of said journal members having an internally splined portion, a plurality of peripherally splined portions formed on said quill shaft and located so as to be engaged by the splined portions of said journal members, said quill shaft, splined portions and journal members being elements forming a driving connection for said rotatable elements, a reduced cross-sectional area shear portion formed in one of the elements of each of said driving connections whereby upon occurrence of a predetermined excessive torque on one particular rotatable element, the shear section will shear thereby severing the rotatable element and permitting the other rotatable elements to continue functioning.

6. A driving mechanism as defined in claim 5 in which the quill shaft between the splined portions thereof is of a diameter less than the internal diameter of said journal members and said rotatable elements which will allow the quill shaft to rotate free and clear of the rotatable element and journal member after the occurrence of excessive torque which severs the rotatable element from the remaining rotatable elements.

JOHN ALFRED LAUCK.

References Cited in the file of this patent

UNITED STATES PATENTS

| Number | Name | Date |
|---|---|---|
| 1,629,121 | Russel et al. | May 17, 1927 |
| 1,953,827 | Hillier | Apr. 3, 1934 |
| 2,173,578 | Egersdorfer et al. | Sept. 19, 1939 |
| 2,218,565 | Vickers | Oct. 22, 1940 |
| 2,280,392 | Herman et al. | Apr. 21, 1942 |
| 2,366,388 | Crosby | Jan. 2, 1945 |
| 2,420,622 | Roth et al. | May 13, 1947 |
| 2,432,502 | Bentley et al. | Dec. 16, 1947 |
| 2,440,371 | Holley | Apr. 27, 1948 |
| 2,487,449 | Knudson | Nov. 8, 1949 |